United States Patent
Weinhold et al.

(10) Patent No.: US 7,827,822 B2
(45) Date of Patent: Nov. 9, 2010

(54) METHOD AND APPARATUS FOR SPRAY-FORMING MELTS OF GLASS AND GLASS-CERAMIC COMPOSITIONS

(75) Inventors: Carsten Weinhold, Scranton, PA (US); David John Yuhas, Clarks-Summit, PA (US)

(73) Assignee: Schott Corporation, Elmsford, NY (US)

( * ) Notice: Subject to any disclaimer, the term of this patent is extended or adjusted under 35 U.S.C. 154(b) by 189 days.

(21) Appl. No.: 11/878,625

(22) Filed: Jul. 25, 2007

(65) Prior Publication Data

US 2009/0025425 A1   Jan. 29, 2009

(51) Int. Cl.
- C03B 19/10 (2006.01)
- C03B 37/005 (2006.01)
- B22F 9/00 (2006.01)
- B22F 9/06 (2006.01)

(52) U.S. Cl. ............... 65/21.1; 75/331; 75/338
(58) Field of Classification Search ......... 65/21.1–21.5; 264/9–14
See application file for complete search history.

(56) References Cited

U.S. PATENT DOCUMENTS

| | | | | |
|---|---|---|---|---|
| 2,997,245 A * | 8/1961 | Nilsson et al. | ........... | 241/1 |
| 3,067,956 A | 12/1962 | Tove | | |
| 3,771,929 A * | 11/1973 | Hellman et al. | ........... | 425/7 |
| 3,826,301 A * | 7/1974 | Brooks | ........... | 164/46 |
| 4,066,117 A * | 1/1978 | Clark et al. | ........... | 164/46 |
| 4,469,313 A * | 9/1984 | Ichidate et al. | ........... | 266/207 |
| 4,472,329 A * | 9/1984 | Muschelknautz et al. | ........... | 264/12 |
| 4,485,834 A * | 12/1984 | Grant | ........... | 164/46 |
| 4,575,325 A * | 3/1986 | Duerig et al. | ........... | 425/7 |
| 4,619,845 A * | 10/1986 | Ayers et al. | ........... | 427/422 |
| 4,784,302 A * | 11/1988 | Raman et al. | ........... | 222/603 |
| 4,919,853 A | 4/1990 | Alvarez et al. | | |
| 5,260,003 A * | 11/1993 | Nyssen et al. | ........... | 264/6 |
| 5,372,629 A * | 12/1994 | Anderson et al. | ........... | 75/332 |
| 5,445,324 A | 8/1995 | Berry et al. | | |
| 5,529,809 A | 6/1996 | Glovan et al. | | |
| 5,718,863 A | 2/1998 | McHugh et al. | | |
| 6,142,382 A * | 11/2000 | Ting et al. | ........... | 239/8 |
| 6,174,468 B1 * | 1/2001 | Zeigler et al. | ........... | 264/12 |
| 6,444,009 B1 * | 9/2002 | Liu et al. | ........... | 75/332 |
| 2004/0124270 A1 * | 7/2004 | Zhou | ........... | 239/399 |
| 2005/0206023 A1 | 9/2005 | Hanna et al. | | |
| 2009/0025425 A1 * | 1/2009 | Weinhold et al. | ........... | 65/21.2 |

OTHER PUBLICATIONS

J. Bossert et al, Liquid Phase Sintering of Dense and Porous Glass-Ceramics from Coal Fly-Ash and Waste Glass, Science of Sintering, 2004, vol. 36, pp. 87-92.

Hyung Sun Kim et al, Microstructure control of sintered glass-ceramics in silicate system, Journal of Ceramic Processing Research, 2000, vol. 1 No. 2, pp. 96-101.

* cited by examiner

*Primary Examiner*—Richard Crispino
*Assistant Examiner*—Jodi Cohen
(74) *Attorney, Agent, or Firm*—Millen, White, Zelano & Branigan, P.C.

(57) ABSTRACT

The invention relates to a process and apparatus for forming a particulate composition, especially a particle glass composition, through the use of shock waves. A nozzle element is utilized having inlets for introduction of cold and heated gas and a delivery tube for introducing molten material. Through the introduction of the cold and heated gases, droplets are formed from a molten stream, a cone-shaped standing shock wave is formed, and shock waves are formed via a modified Hartmann-Sprenger chamber, the shock waves impinging on the droplet stream to break up the larger droplets.

15 Claims, 9 Drawing Sheets

METHOD AND APPARATUS FOR SPRAY-FORMING MELTS OF GLASS AND GLASS-CERAMIC COMPOSITIONS

The invention relates to a method and apparatus for preparing particulates from melts of glass or glass-ceramic compositions by spray-forming. In particular, the invention relates to a method and apparatus for preparing glass compositions of small particles, with narrow size distribution, in bulk quantities (>1 kg/min).

BACKGROUND OF THE INVENTION

There are numerous known methods for spraying molten material (mostly metals and polymers) to obtain particulate powders, such as spherical powders, having a defined size.

U.S. Pat. No. 2,997,245 discloses an apparatus for pulverizing and/or decomposing solid as well as molten materials. One embodiment of the apparatus comprises a crucible, which contains molten material, and is positioned above a system of annular resonator chambers resembling a Hartmann-Sprenger chamber. Compressed gas streams through an annulus against an edge belonging to a first annular resonator chamber, and then into a second annular resonator chamber. The arrangement of both resonator chambers generates supersonic, non-stationary shockwaves having ultrasonic frequency, which are then directed towards and focused on a small area of the material to be pulverized.

U.S. Pat. No. 4,485,834 discloses an apparatus for atomizing a molten material such as complex metal alloys, i.e., materials which are solid at room temperature. The apparatus utilizes an atomization die assembly which comprises a set of opposed linearly configured die elements which define a longitudinally configured die space or gap through which a sheet of molten material is discharged. The die elements have oppositely disposed orifice-bearing surfaces which form a nozzle assembly. An ultrasonic atomizing gas exits the linear array of orifices and impinges against a predetermined focal region of a sheet of molten material passing through the die space or gap. Each of the orifices have having resonating cavities associated therewith for generating ultrasonic high frequency shock waves for disintegrating the sheet of molten material at the focal region into fine particles. The ultrasonic shock waves generated exhibit frequencies of about 20 kHz to 30 kHz (primary), and at about 100 kHz (secondary).

SUMMARY OF THE INVENTION

While the known processes and systems provide for formation of solid particles through the use of ultrasonic shockwaves, the resultant particles can vary widely in size distribution. The formation of glass and glass ceramic particles having a controlled particle size distribution is important for processes which utilize such materials as precursors, such as in the preparation of opto-ceramic elements, filter media, and catalysts supports. Thus, the present invention is directed to a method and an apparatus for providing solids particles, especially glass and glass ceramic particles, by subjecting a stream of molten material to ultrasonic shock waves, whereby the size distribution of the resultant particles can be easily controlled.

Furthermore, previously disclosed processes and systems often require complex arrangements to heat the melt delivery tube during operation, such as by injecting pressurized preheated gas, in order to prevent freezing of the melt discharge outlet. Additionally, many known processes require the pressurization of the melting crucible in order to force the melt into an atomizer. Thus, the present invention is directed to a method and an apparatus for providing solids particles which does not require the pressurization of the melting crucible, and does not required the supply of preheated gas at pressures in excess of 2 bar.

According to a process aspect of the invention, there is provided a process for the production of particulate compositions, especially particulate glass compositions, the process comprising:

providing a super-sonic nozzle element having an inlet, a gas amplifier section, a shockwave generator section, a delivery tube for introducing molten material, a super-sonic nozzle element, and an outlet for discharging particles formed from said molten material, said delivery tube being positioned within said inlet of said super-sonic nozzle element, a peripheral opening (preferably an annular opening) being formed between said inlet of said super-sonic nozzle and said delivery tube, said super-sonic nozzle further comprising at least one first opening in the gas amplifier section for introducing a cold gas (e.g., air at a temperature of 0° C. to 100° C. and a pressure of 1-200 bar) into said nozzle element, said first opening being positioned below said peripheral opening to create a low-pressure zone in said nozzle element, and said super-sonic nozzle further comprising at least one second inlet in the shockwave generator section for introducing a cold gas (e.g., air at a temperature of 0° C. to 100° C. and a pressure of 1-200 bar) into said nozzle element at a point adjacent said outlet of said super-sonic nozzle, introducing a cold gas (e.g., air at a temperature of 0° C. to 100° C. and a pressure of 1-200 bar) into said first opening of said nozzle element thereby pulling a preheated gas (including air, CO, $CO_2$, Ar, He, $N_2$, or mixtures thereof) at a temperature of 750° C. to 2000° C.) into said nozzle element through said peripheral opening, introducing a stream of molten material through said delivery tube whereby gas flowing through the nozzle severs liquid material from the outlet of the delivery tube forming droplets of molten material, forming a standing cone-shaped shockwave within said super-sonic nozzle adjacent the outlet of said super-sonic nozzle, introducing a cold gas (e.g., air at a temperature of 0° C. to 100° C. and a pressure of 1-200 bar, preferably 5-200 bar) into said second opening of said nozzle element thereby creating non-stationary shock waves at ultrasonic frequencies which are transferred through the cone-shaped shockwave to the droplets of molten material thereby breaking up larger droplets, and forming particles by quenching the resultant droplets discharged from the outlet of said super-sonic nozzle.

According to an apparatus aspect of the invention, there is provided an apparatus for the production of particulate compositions, especially particulate glass compositions, the apparatus comprising:

a super-sonic nozzle element having an inlet, a gas amplifier section, a shockwave generator section, a delivery tube for introducing molten material, a super-sonic nozzle element, and an outlet for discharging particles formed from molten material, said delivery tube being positioned within said inlet of said super-sonic nozzle element, a peripheral opening (preferably an annular opening) being formed between said inlet of said super-sonic nozzle and said delivery tube, said super-sonic nozzle further comprising at least one first opening in the gas amplifier section for introducing a cold gas into said nozzle element, said first opening being positioned below said peripheral opening to create a low-pressure zone in said nozzle element, and said super-sonic nozzle further comprising at least one second opening in the shockwave generator section for introducing a cold gas into said nozzle element at a point adjacent said outlet of said super-sonic nozzle, and said nozzle having a geometry whereby introduction of a gas (e.g., air at 0° C. to 100° C. and a pressure of 1-200 bar, preferably 5-200 bar) into said second opening of said nozzle element will create shock waves.

The invention uses modified sonic/supersonic nozzle geometries in a novel arrangement. These modifications of nozzle geometry can be achieved using by using methods known to those skilled in the art of jet engine design and fuel injection.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

As shown in FIG. 1, the super-sonic nozzle apparatus comprises a gas amplifier section and a shock wave generator. Each of these sections has a gas inlet (referred to as Gas Inlet 1 for the Gas Amplifier and Gas Inlet 2 for the shock wave generator) for introducing a cold gas such as cold air, into the interior of the nozzle. The gas is generally introduced through each of these inlets at a temperature of 0° C. to 100° C., a pressure of, for example, 1 bar to 200 bar, preferably higher than 5 bar. Gas pressure and flow-rate depend on the material to be sprayed; typically, the pressure of the gas supplied to the shockwave generator will be higher than the pressure of the gas supplied to the Gas Amplifier. Dry air is the preferred gas for these inlets, although other suitable gases such as He, $N_2$, Ar, or mixtures thereof can be used. Depending on the application for the particles to be produced the compressed gas supplied can be either inert or reactive.

Additionally, the system is provided with a tube (referred to as the Refractory Metal Delivery Tube) for introducing the molten material into the nozzle. The tube is connected to a source of molten material, preferably molten glass. The tube is positioned so that the outlet of the tube, from which the molten material is dispensed, is within the nozzle and a peripheral opening (preferably, an annular opening) is formed between the inlet of the nozzle and the delivery tube. This peripheral opening provides an inlet for the introduction of a heated gas such air, CO, $CO_2$, He, $N_2$, Argon, etc., or mixtures thereof. The preheated gas is generally at a pressure of 1 to 2 bar, which is always lower than the pressure of the gas supplied through Gas Inlet 1, and a temperature of generally 750° C. to 2000° C. In general, the temperature and the pressure of the preheated gas depend on the material to be sprayed.

Figure 9:
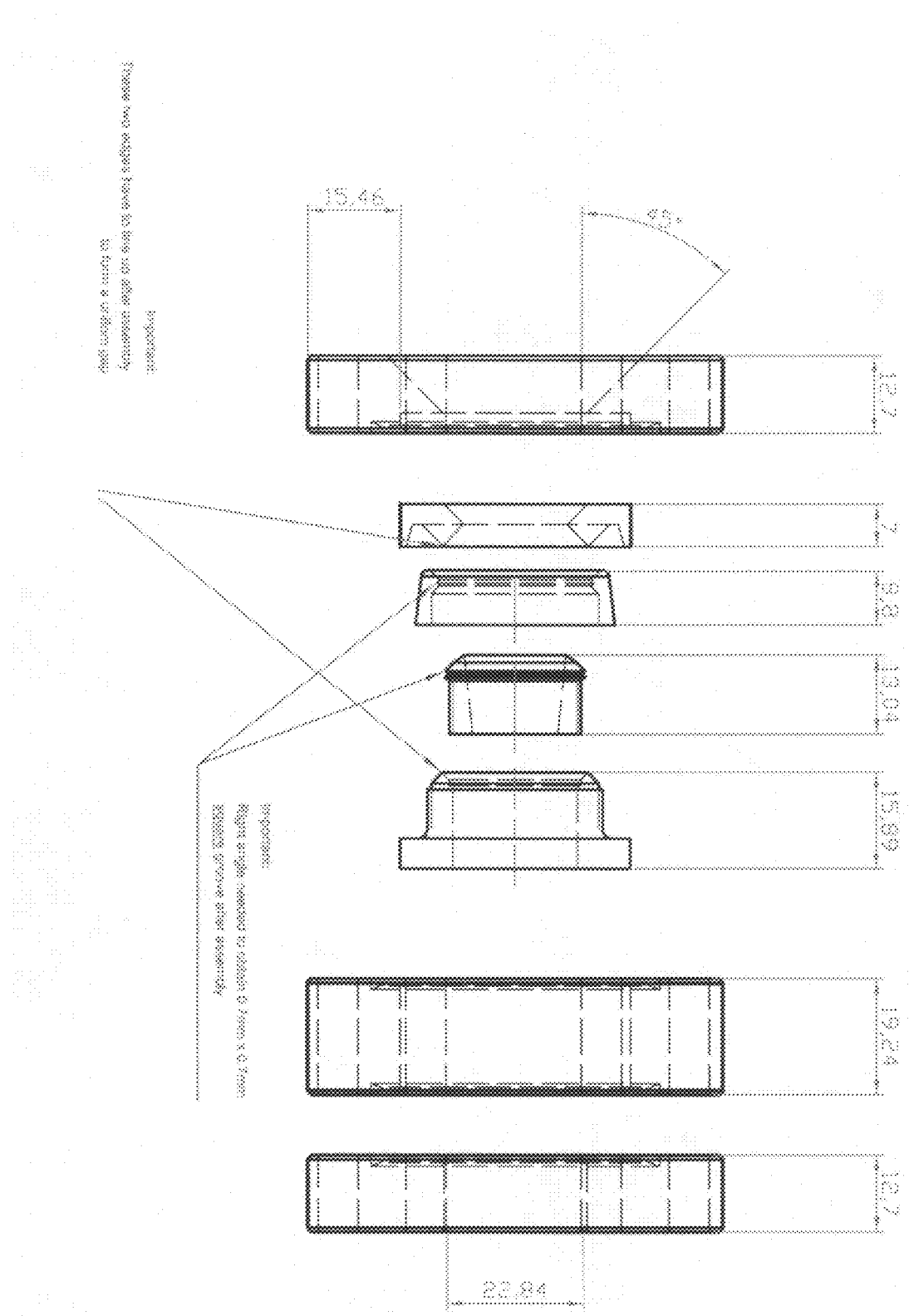
FIG. 9 shows an arrangement for the shock wave generator formed from an adjustable ringset.

The Shockwave Generator is preferably made from an Adjustable Ringset comprising 4 rings which define the shape of the resonating cavities, each of which resembles a modified Hartmann-Sprenger chamber (similar in shape to the modified Hartmann-Sprenger chamber of U.S. Pat. No. 4,485,834). See FIG. 9. To alter the size and/or shape of the annular gap of the Shockwave Generator (discussed further below), the individual rings of the Adjustable Ringset can be replaced, or moved relative to the other rings along a thread. The adjustment allows the fine-tuning of the arrangement for a given operating pressure to achieve the highest-possible shockwave amplitudes.

Figure 1:
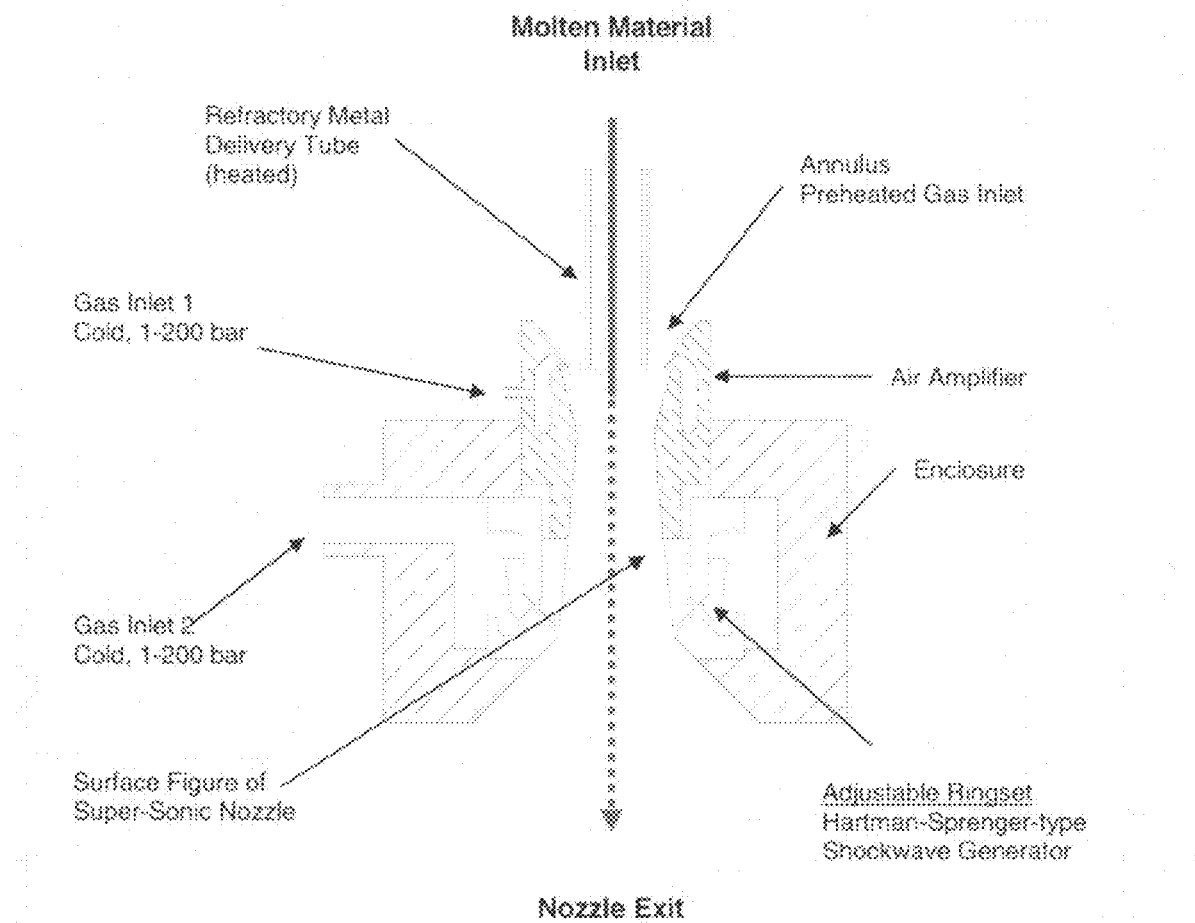
FIG. 1 shows a cross section of the overall melt-spray apparatus according to the invention comprising the super-sonic nozzle and molten material delivery tube.
Figure 2:
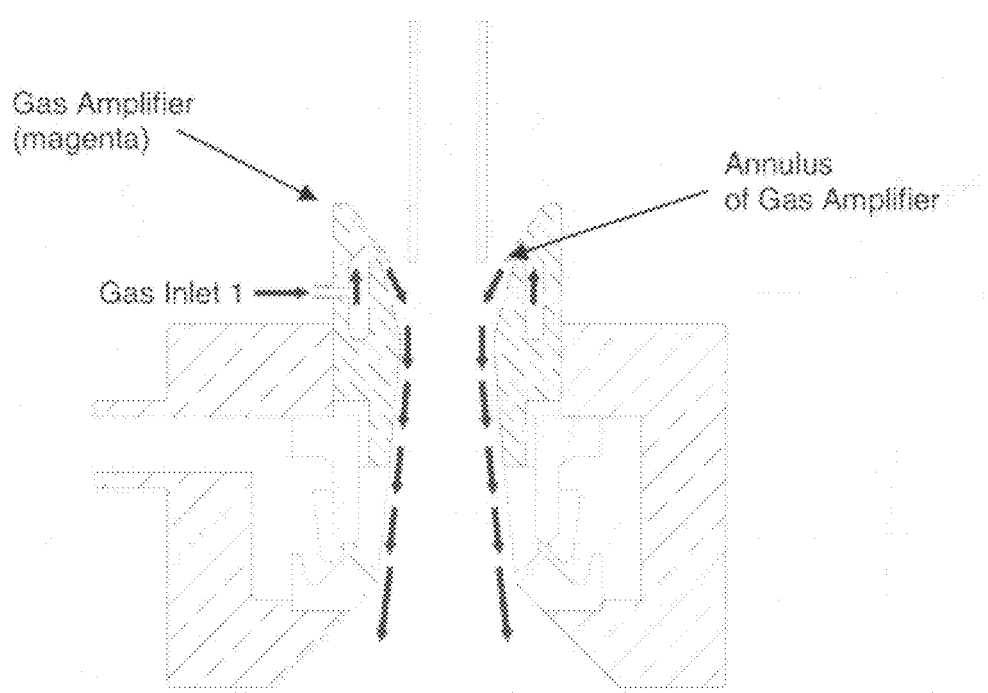
FIG. 2 illustrates the introduction of cold gas (e.g., air) into the air or gas amplifier section of the super-sonic nozzle.
Figure 3:
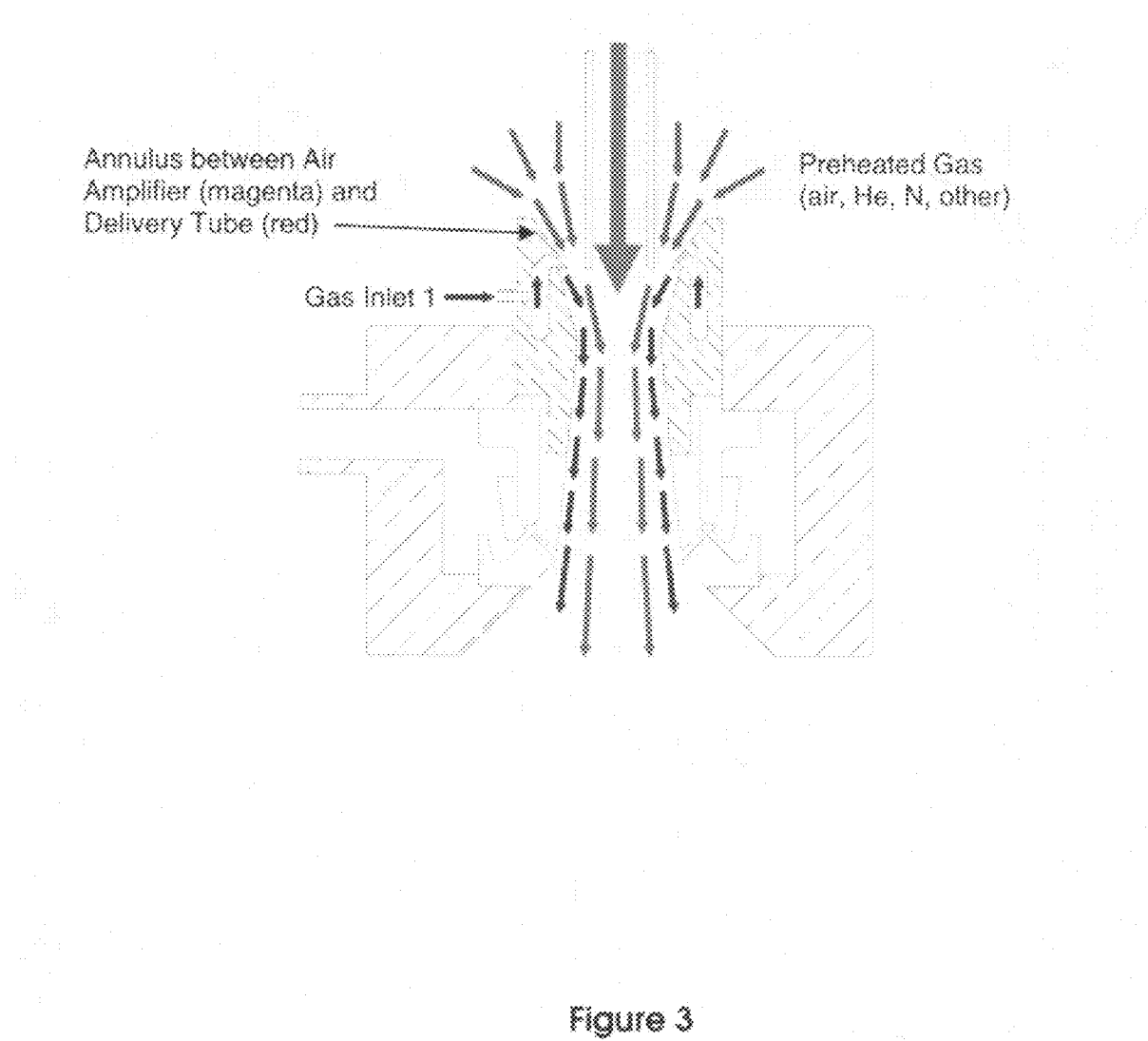
FIG. 3 illustrates the introduction of heated gas through the peripheral opening formed between the molten material delivery tube and the inlet of the super-sonic nozzle.
Figure 4:
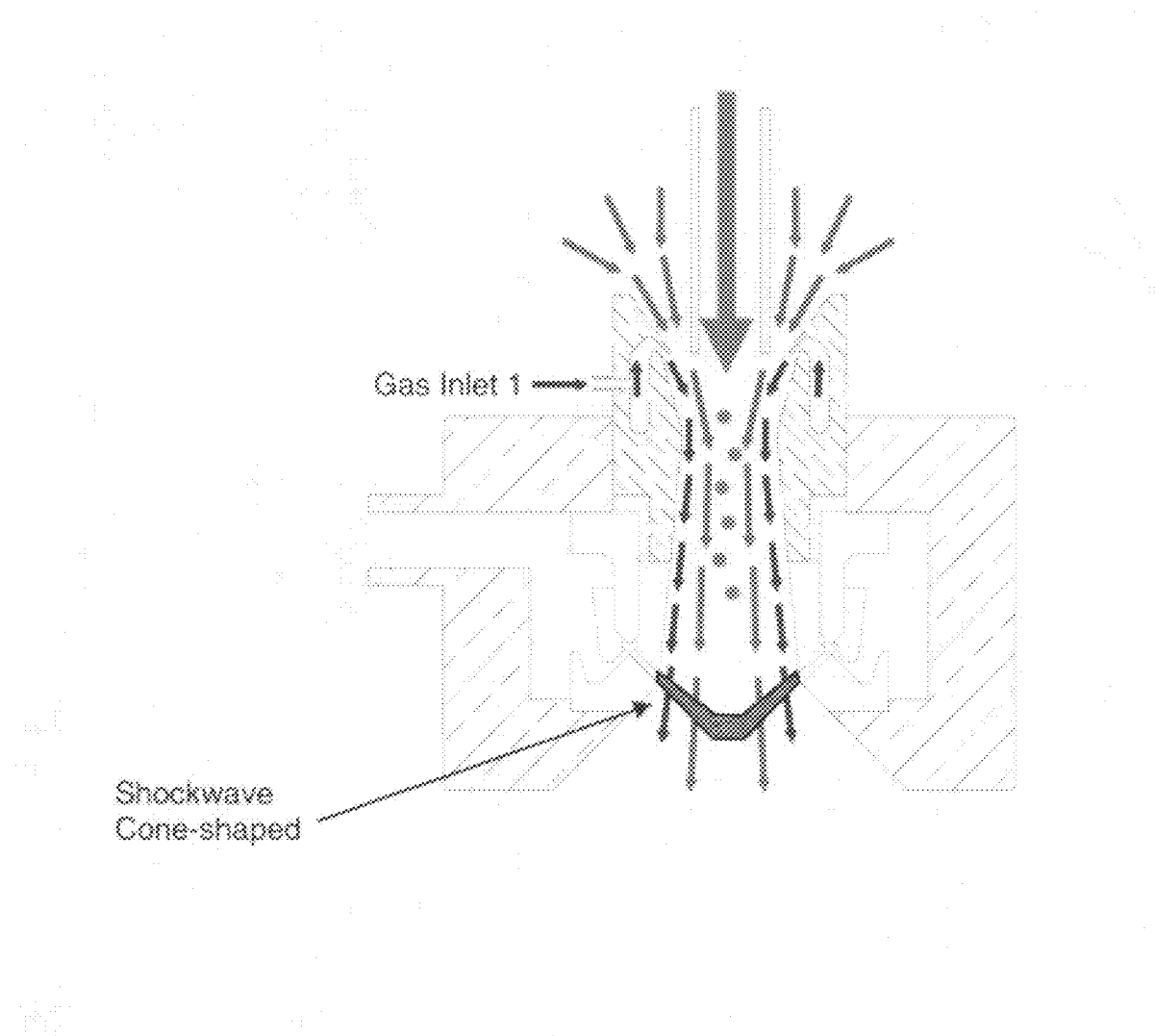
FIG. 4 illustrates the formation of droplets form the end of the molten material delivery tube and the formation of a standing cone-shaped shock wave in the shock wave generator section of the super-sonic nozzle.
Figure 5:
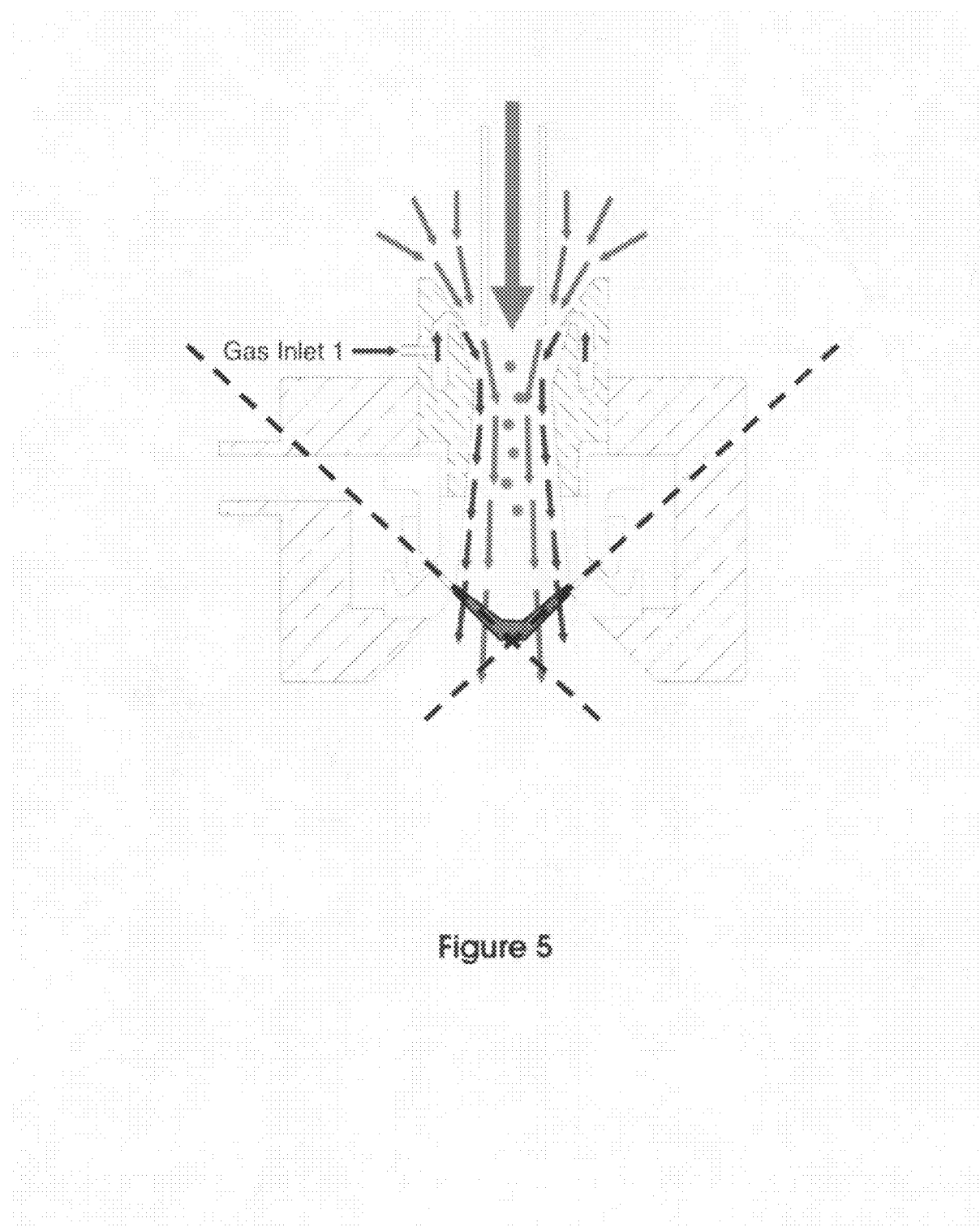
FIG. 5 illustrates the geometry of the super-sonic nozzle being such that angle of the shock wave cone is equal or substantially equal to the angle of the gas (e.g., air) outlet in the shock wave generator section of the super-sonic nozzle.
Figure 6:
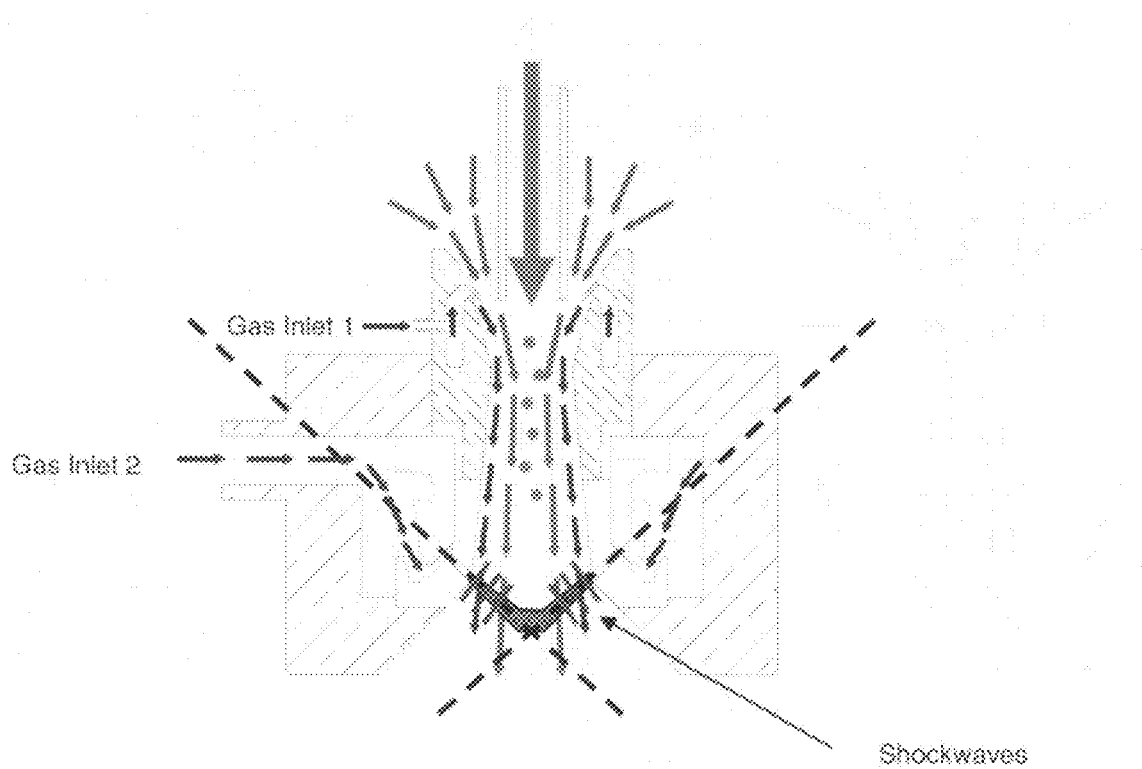
FIG. 6 illustrates the generation of shock waves and the transfer thereof through the cone-shaped shock wave into the particle stream.
Figure 7:
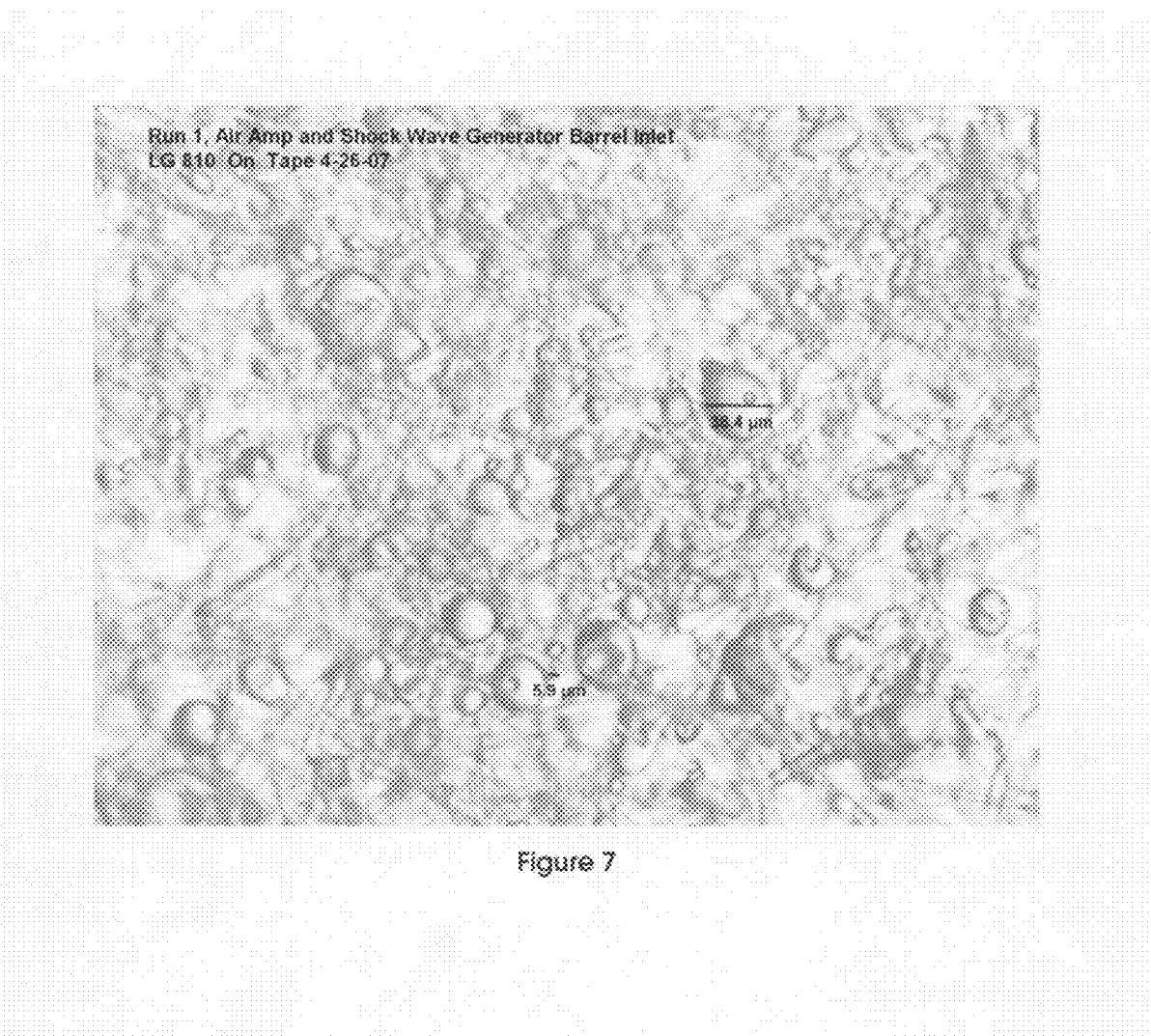
FIG. 7 is an optical microscope image of particulates produced according to Example 1.

As illustrated in FIG. 2, a cold compressed air stream can be introduced through Gas Inlet 1 of the Gas Amplifier section and exits an annular gap in the wall of the nozzle at a point slightly below the outlet of the delivery tube. This air stream generates a local low-pressure zone due to the Coanda effect, thereby pulling preheated gas (air, He, $N_2$, others) through the opening between the delivery tube and the surrounding Gas Amplifier section of the nozzle. The resultant stream of hot gas severs liquid material from the outlet of the delivery tube.

The resultant mixture of cold/hot gas and particles enters the diffuser part of a super-sonic nozzle. As described in more detail below, a standing shockwave is formed at the outlet of the diffuser. Ultrasonic shockwaves, generated by the introduction of compressed gas (e.g., air) through Gas Inlet 2 into a modified Hartmann-Sprenger chamber, are transmitted into the gas/particle stream, to further breakup larger particles, thus narrowing the particle size distribution.

In operation, referring to the arrows in FIG. 2, cold compressed air (1 bar-200 bar) is applied to the Gas Amplifier through Gas Inlet 1, and exits through an annulus into the interior of the nozzle. The cold air clings to the surface of a super-sonic nozzle, expands and accelerates. This air stream generates a local low-pressure zone around the Refractory Metal Delivery Tube, pulling in preheated gas (air, He, $N_2$, other or mixtures thereof) through the annulus between the Refractory Metal Delivery Tube and the Gas Amplifier. See FIG. 3.

Molten material is then supplied through the Refractory Metal Delivery Tube. The rapidly moving gas stream severs droplets from the end of the tube; the mixture of particles, cold and hot gas passes through the supersonic nozzle. See FIG. 4. The gas stream cools the droplets and thereby heats up and expands. This results in the formation of a cone-shaped standing shockwave at the nozzle outlet. The angle of the shockwave-cone is determined by the properties of the gas stream (temperature, pressure, flow rates) as well as the supersonic nozzle geometry. The geometry of the nozzle is selected such that in operation the angle of the shockwave-cone is equal to the angle of the outlet of the shockwave generator. See FIG. 5.

Once the shockwave-cone is stable, compressed air at a pressure of, for example, 5 to 200 bar is supplied through Gas Inlet 2 and enters a distribution manifold. From the manifold, the air enters through an annular gap into a modified Hartmann-Sprenger chamber wherein a shockwave is generated. In a typical arrangement, pressure pulses at frequencies of 20 kHz, 30 kHz and 100 kHz are generated in the shockwave-generator. These shock waves exit the chamber into the nozzle through an annular gap and are transferred through the shockwave-cone into the particle stream. The shockwaves interact with the droplets in the gas stream breaking up larger particles. After exiting the nozzle, the particles are quickly quenched by the surrounding atmosphere.

Figure 8:
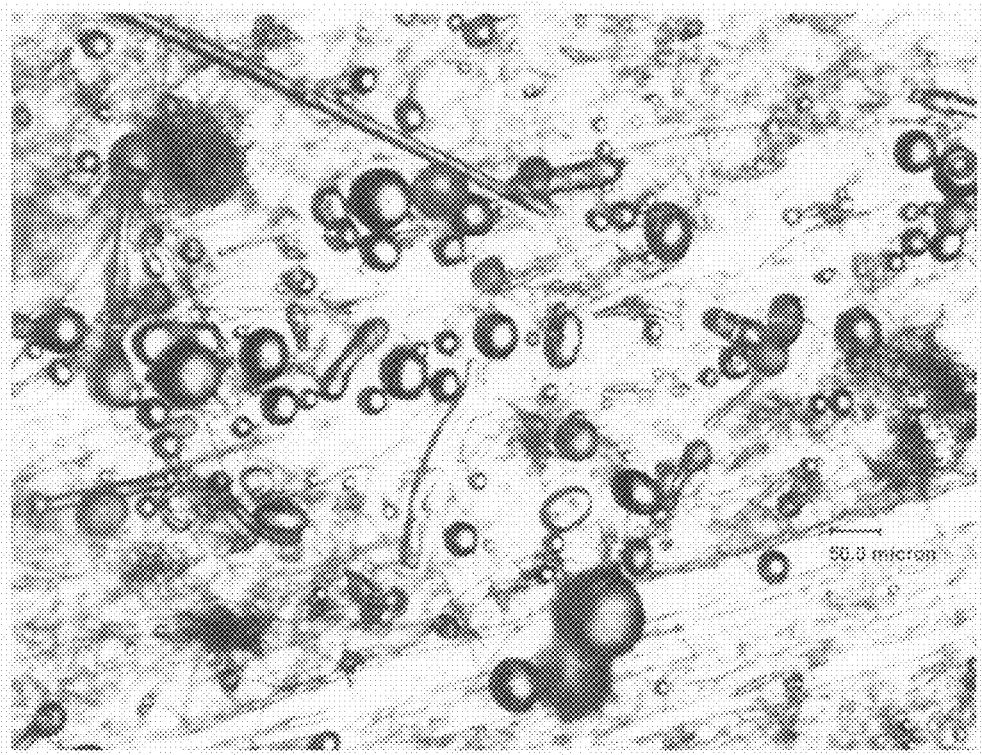
FIG. 8 is an optical microscope image of particulates produced according to Example 2.

The resultant particulate products form the process according to the invention can be used in a variety of applications that utilize glass or glass ceramic particles as precursor materials. For example, glass or glass ceramic particles can be used to produce catalyst supports, such as supports for high temperature catalysts, and filtration media, i.e., both liquid and gas filtration media.

In addition, the process according to the invention can be used as a starting material for making nano-porous microparticles, as described in copending and commonly-assigned patent application, entitled "Nano-Porous Precursors for Opto-Ceramics via Novel Reactive Dissolution," Ser. No. 11/878,626, filed even date herewith, the entire disclosure of which is hereby incorporated by reference. These nano-porous microparticles can be used to prepare catalyst supports, filtration media, and opto-ceramic elements, particularly opto-ceramic element for use in high energy laser applications.

The process and apparatus according to the invention can used for processing materials that melt at temperatures ranging from, for example, room temperature to in excess of 2500° C., where the upper temperature is only limited by the refractoriness of the containment (melting crucible).

Further, the process and apparatus according to the invention are particularly advantageous for processing materials that are highly unstable, such as compositions that rapidly crystallize and/or undergo phase separate upon cooling, owing to the rapid cooling rates of the inventive process.

The particulates formed by the process can be directly sprayed to form a coating, a three dimensional object (with or without the use of a mold), or can be collected as loose solid particles. The loose solid particulates can exhibit a number of physical characteristics depending on the operational parameters and/r composition of the melt. For example, the formed particles can be: spherical (normal shape, due to surface tension), hollow (due to gas evolution during cooling), flattened spheres (molten glass hitting a surface), fibers (using high speed laminar flow), or irregular smooth surfaced particulates (teardrops, donuts, etc).

The melt spraying process according to the invention has various advantages. The process can be used to prepare particulates with uniform chemistry and uniform thermal history. The particles are formed directly from the melt thereby reducing the amount post-particle formation processing. Further, the process parameters can be adjusted to control the particle size distribution range and can be used to provide particulate corn positions with a narrow size distribution. The process is applicable to glasses with a wide range of melt temperatures and does not require the use of binders. The process permits the redox characteristics of glass to be controlled by the melt/spraying conditions. Further, the particulates can be produced in an inert environment, thus eliminating/reducing the chance for surface contamination, hydrolysis, adsorption, etc.

EXAMPLES

Example 1

Spraytest of Laser Glass LG-810

The laserglass LG-810 cullet was melted at a temperature of 1000° C. in a gas-heated 100 ml-crucible made out of high-temperature steel, and supplied to the spray-forming apparatus through a stainless-steel pipe with 5 mm diameter. Compressed air provided by a diesel compressor (AirMan 185CFM) at a sustained pressure of 8 bar and a peak flow rate of 180 SCFM was supplied to Gas Inlet 1 and Gas Inlet 2. The composition of the Nd-doped fluorophosphate laser glass LG-810 developed for high-energy laser applications at 1060 nm is as follows (see: Lee Cook and Karl-Heinz Mader, "Ultraviolet Transmission Characteristics of a Fluorophosphate Laser Glass", Journal of The American Ceramic Society, Vol. 65, No. 5, December 1982):

| Compound | Weight % |
|---|---|
| $P_2O_5$ | 9.69 |
| $AlF_3$ | 33.17 |
| NaF | 5.43 |
| KF | 3.62 |
| $MgF_2$ | 5.83 |
| $CaF_2$ | 30.45 |
| $SrF_2$ | 8.82 |
| $LaF_3$ | 2.00 |
| $NdF_3$ | 2.00 |

After establishing flow, the spray-forming of the molten material was completed in less than 5 seconds. The resultant product was a mixture of fibers and spherical particles. See FIG. 7. Due to the limited amount of glass supplied no attempt was made to separate the fiber generated during startup from the particulate produced towards the end of the run. The particulate obtained was characterized using optical microscopy, and consisted of fibers with sub-micron diameter, and spherical particulate having an average diameter of about 10 um.

Example 2

Spraytest of a Borosilicate Glass

The borosilicate glass was molten from cullet at a temperature of 1550° C. in an inductively heated 100 ml-crucible made out of a platinum-iridium alloy, and supplied to the spray-forming apparatus through a platinum-iridium alloy pipe with 5 mm diameter. Compressed air provided by a diesel compressor (AirMan 185 CFM) at a peak pressure of 8 bar and a peak flow rate of 180 SCFM was supplied to Gas Inlet 1 and Gas Inlet 2. The composition of the borosilicate glass was as follows:

| Oxide | Weight % |
|---|---|
| $Na_2O$ | 6.70 |
| $B_2O_3$ | 28.95 |
| $SiO_2$ | 64.35 |

After establishing flow, the spray-forming of the molten material was completed in less than 5 seconds. The resultant product was a mixture of fibers and spherical particles. See FIG. 8. Due to the limited amount of glass supplied no attempt was made to separate the fiber generated during startup from the particulate produced towards the end of the run. The particulate obtained was characterized using optical microscopy, and consisted of fibers with micron diameter, and two fractions of spherical particulate having an average diameter of about 10 um and of about 25 um.

The entire disclosures of all applications, patents and publications, cited herein are incorporated by reference herein.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of particulate compositions, said process comprising:
    providing a nozzle element for producing a super-sonic shockwave, said nozzle element having an inlet, a gas amplifier section adjacent said inlet of the nozzle element, a shockwave generator section downstream of said gas amplifier section, a delivery tube for introducing molten material, and an outlet for discharging particles formed from said molten material,
    said delivery tube being positioned within said inlet of said nozzle element, a peripheral opening being formed between said inlet of said nozzle element and said delivery tube, said nozzle element further comprising at least one first opening in the gas amplifier section for introducing a first relatively cold gas into said nozzle element, said first opening being positioned below said peripheral opening to create a low-pressure zone in said nozzle element, and said nozzle element further comprising at least one second opening in the shockwave generator section for introducing a second relatively cold gas into said nozzle element at a point adjacent said outlet of said nozzle element,
    providing a relatively hot gas at said peripheral opening formed between said inlet of said nozzle element and said delivery tube, and introducing a first relatively cold gas into said first opening of said nozzle element to create said low-pressure zone in said nozzle element thereby pulling said relatively hot gas into said nozzle element through said peripheral opening,
    introducing a stream of molten material through said delivery tube whereby said relatively hot gas flowing through the nozzle severs liquid material from the outlet of the delivery tube forming droplets of molten material,
    forming a standing cone-shaped shockwave within said nozzle element adjacent the outlet of said nozzle element,
    introducing a second relatively cold gas into said second opening of said nozzle element thereby creating non-stationary shock waves at ultrasonic frequencies which are transferred through the cone-shaped shockwave to the droplets of molten material thereby breaking up larger droplets, and
    forming particles by quenching the resultant droplets discharged from the outlet of said nozzle element.

2. A process according to claim 1, wherein said first relatively cold gas introduced into said first opening of said nozzle element is at a temperature of 0° C. to 100° C. and a pressure of 1-200 bar, said relatively hot gas pulled into said nozzle element through said peripheral opening is at a temperature of 750° C. to 2000° C. and a pressure of less than 2 bar, and said second relatively cold gas introduced into said second opening of said nozzle element is at a temperature of 0° C. to 100° C. and a pressure of 1-200 bar.

3. A process according to claim 2, wherein said second relatively cold gas introduced into said second opening of said nozzle element is at a pressure of 5-200 bar.

4. A process according to claim 2, wherein said relatively hot gas pulled into said nozzle element through said peripheral opening is at a pressure of 1-2 bar.

5. A process according to claim 1, wherein said first relatively cold gas introduced into said first opening of said nozzle element is air, said relatively hot gas pulled into said nozzle element through said peripheral opening is air, CO, $CO_2$, Ar, He, $N_2$, or any mixture thereof, and said second relatively cold gas introduced into said second opening of said nozzle element is air.

6. A process according to claim 1, wherein said molten material is a molten glass composition.

7. A process according to claim 1, wherein said peripheral opening is an annular opening.

8. A process according to claim 1, wherein said shockwave generator is made from an adjustable set of rings which permit the size and/or shape of the second opening to be adjusted.

9. A process according to claim 1, wherein the angle of the shockwave-cone is equal to the angle of the outlet of the shockwave generator.

10. A process according to claim 1, wherein shockwaves of 20 kHz, 30 kHz and 100 kHz are generated in the shockwave-generator.

11. A process according to claim 1, wherein said molten material is a glass composition which is unstable and will normally undergo rapid crystallize and/or phase separate upon cooling.

12. An apparatus for the production of particulate compositions, said apparatus comprising:
    a nozzle element for producing a super-sonic shockwave, said nozzle element having an inlet, a gas amplifier section, a shockwave generator section, a delivery tube for introducing molten material, and an outlet for discharging particles formed from molten material,
    said delivery tube being positioned within said inlet of said nozzle element, a peripheral opening being formed between said inlet of said super sonic nozzle element and said delivery tube, said nozzle element further comprising at least one first opening in the gas amplifier section for introducing a cold gas into said nozzle element, said first opening being positioned below said peripheral opening to create a low-pressure zone in said nozzle element, and said nozzle element further comprising at least one second opening in the shockwave generator section for introducing a cold gas into said nozzle element at a point adjacent said outlet of said nozzle element, and
    said nozzle having a geometry whereby introduction of a gas into said second opening of said nozzle element will create shock waves.

13. An apparatus according to claim 12, wherein said peripheral opening is an annular opening.

14. An apparatus according to claim 12, wherein said shockwave generator is made from an adjustable set of rings which permit the size and/or shape of the second opening to be adjusted.

15. An apparatus according to claim 12, wherein the angle of the shockwave-cone is equal to the angle of the outlet of the shockwave generator.

* * * * *

UNITED STATES PATENT AND TRADEMARK OFFICE
CERTIFICATE OF CORRECTION

| | | |
|---|---|---|
| PATENT NO. | : 7,827,822 B2 | Page 1 of 1 |
| APPLICATION NO. | : 11/878625 | |
| DATED | : November 9, 2010 | |
| INVENTOR(S) | : Weinhold et al. | |

It is certified that error appears in the above-identified patent and that said Letters Patent is hereby corrected as shown below:

Column 8, line 54, reads "between said inlet of said super sonic nozzle element" should read
-- between said inlet of said nozzle element --

Signed and Sealed this
Twenty-fifth Day of January, 2011

David J. Kappos
*Director of the United States Patent and Trademark Office*